United States Patent
Saito (10) Patent No.: US 7,969,505 B2
(45) Date of Patent: Jun. 28, 2011

(54) ELECTRONIC DEVICE INCLUDING A CAMERA UNIT WITH AN IMAGE CAPTURING FUNCTION AND AN OPERATIONS-UNIT ILLUMINATING FUNCTION

(75) Inventor: Koji Saito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 402 days.

(21) Appl. No.: 11/896,641

(22) Filed: Sep. 4, 2007

(65) Prior Publication Data
US 2008/0002049 A1 Jan. 3, 2008

Related U.S. Application Data

(63) Continuation of application No. PCT/JP2005/005357, filed on Mar. 24, 2005.

(51) Int. Cl.
H04N 5/225 (2006.01)
H04N 5/222 (2006.01)
G03B 15/02 (2006.01)
F21V 21/26 (2006.01)

(52) U.S. Cl. ............ 348/373; 348/370; 348/371; 362/7; 362/8; 362/11; 362/269

(58) Field of Classification Search .......... 348/370, 348/371, 373; 362/7, 8, 11, 269, 277, 285, 362/287
See application file for complete search history.

(56) References Cited

U.S. PATENT DOCUMENTS

| 5,122,937 | A | * | 6/1992 | Stoudemire | ................. | 362/109 |
| 5,183,325 | A | * | 2/1993 | Hurdle | ......................... | 362/109 |
| 5,379,201 | A | * | 1/1995 | Friedman | ..................... | 362/191 |
| 6,373,006 | B1 | * | 4/2002 | Toki | ............................ | 200/61.7 |
| 6,784,916 | B2 | * | 8/2004 | Smith | ........................ | 348/14.01 |
| 2002/0085371 | A1 | | 7/2002 | Katayama et al. | | |
| 2002/0131263 | A1 | * | 9/2002 | Naghi et al. | ..................... | 362/98 |
| 2004/0027820 | A1 | * | 2/2004 | Hilmersen | ........................ | 362/8 |
| 2005/0128284 | A1 | * | 6/2005 | Hoffer et al. | ............... | 348/14.02 |
| 2005/0201047 | A1 | * | 9/2005 | Krah | ............................. | 361/683 |
| 2005/0218303 | A1 | * | 10/2005 | Poplin | ..................... | 250/214 AL |
| 2006/0084039 | A1 | * | 4/2006 | Ryokai et al. | ................. | 434/155 |

FOREIGN PATENT DOCUMENTS

| JP | 10-164414 | 6/1998 |
| JP | 2001-195150 | 7/2001 |
| JP | 2001-325043 | 11/2001 |
| JP | 2003-289473 | 10/2003 |
| JP | 2003-309765 | 10/2003 |

OTHER PUBLICATIONS

International Search Report (Form PCT/ISA/210) of the International application No. PCT/JP2005/005357 (mailed on Jun. 21, 2005).
"Is the ThinkPad "Keyboard light" a magic light?" *ThinkPad Weekly Tips*, Think Unthinkable, vol. 9, Web URL: <http://www-6.ibm.com/jp/pc/thinkpad/tips/vol9.html>.
"ThinkPad R Series", Web URL: <http://shop.lenevo.com/us/notebooks/ThinkPad/r-series>.

* cited by examiner

*Primary Examiner* — Lin Ye
*Assistant Examiner* — Chia-Wei A Chen
(74) *Attorney, Agent, or Firm* — Fujitsu Patent Center (57) ABSTRACT

An electronic device is disclosed that includes an operations unit disposed in a device main body for input operations, and a camera unit including a camera for image capturing and a light source that emits light for image capturing. A light irradiation position of the light source is variable so that the light source illuminates the operations unit.

6 Claims, 7 Drawing Sheets

ELECTRONIC DEVICE INCLUDING A CAMERA UNIT WITH AN IMAGE CAPTURING FUNCTION AND AN OPERATIONS-UNIT ILLUMINATING FUNCTION

CROSS-REFERENCE TO RELATED APPLICATIONS

This application is a U.S. continuation application filed under 35 USC 111(a) claiming benefit under 35 USC 120 and 365(c) of PCT application JP2005/005357, filed on Mar. 24, 2005, the entire contents of which are incorporated herein by reference.

BACKGROUND OF THE INVENTION

1. Field of the Invention

The present invention generally relates to an electronic device, and particularly relates to an electronic device having an illumination device that illuminates an operations unit.

2. Description of the Related Art

Portable electronic devices such as laptop personal computers are used in various places because of their portability. These electronic devices are sometime used in dark places such as in a plane flying at night, for example.

For using an electronic device in a plane flying at night, a keyboard for operating the electronic device needs to be illuminated. However, when the light in the plane is off, it is practically difficult to sufficiently illuminate the keyboard by an overhead light. Moreover, use of the overhead light might bother other passengers.

As another solution, light provided by a device installed in a personal computer may be used. Examples of a device installed in a personal computer for providing light include a liquid crystal display and a strobe light (if the computer has a built-in camera equipped with a strobe light) (see Japanese Patent Laid-Open Publication No. 2001-325043).

However, light provided by a liquid crystal display of a common personal computer cannot illuminate the keyboard at a brightness sufficient to operate the keyboard. Especially, when the personal computer is in use, the rotatable section including the liquid crystal display is disposed in an open position at an obtuse angle relative to the stationary section including the keyboard, so that the light provided by the liquid crystal display is hardly incident on the keyboard.

In the case of the personal computer having a camera with a strobe light, the strobe light is designed to work in conjunction with the camera, and therefore only provides flashes. That is, the strobe light cannot continuously illuminate the keyboard.

Some personal computers include operations units having LEDs for indicating operation status, but these LEDs are not bright enough to illuminate the entire operations unit.

SUMMARY OF THE INVENTION

The present invention generally aims to provide an improved useful electronic device that solves one or more of the aforementioned problems.

The present invention particularly aims to provide an electronic device including a simple and space-saving light source that sufficiently illuminates an operations unit even in dark places.

According to an aspect of the present invention, there is provided an electronic device that comprises an operations unit disposed in a device main body for input operations; and a camera unit including a camera for image capturing and a light source that emits light for image capturing; wherein the light irradiation position of the light source is variable so that the light source illuminates the operations unit.

According to this aspect of the present invention, since the light source that emits light as auxiliary light for image capturing by the camera is also used for illuminating the operations unit, it is possible to make the electronic device compact and with fewer components.

It is preferable that the above-described electronic device further comprise a light source position detector that detects the position of the light source to generate position detection information; and a light source control unit that, according to the position detection information generated by the light source position detector, interlocks the emission of light by the light source with the image capturing by the camera when the light source is in an image capturing position for emitting light for image capturing by the camera, and switches the emission of light by the light source from the image capturing by the camera when the light source is in an operations unit illuminating position for emitting light for illuminating the operations unit.

This configuration makes it possible to automatically switch the light source between a mode to be used as auxiliary light for the camera and a mode to be used as illumination for the operations unit according to the position of the light source.

It is also preferable that the above-described electronic device further comprise a light intensity detector that detects a brightness level on the operations unit, wherein the emission of light by the light source for illuminating the operations unit is started or stopped according to the brightness level detected by the light intensity detector.

With this configuration, since the emission of light by the light source is started or stopped according to the brightness level on the operations unit, both operability of the operations unit and efficiency of power use are improved.

It is also preferable that the device main body include a first section in which the operations unit is disposed and a second section in which the camera unit is disposed, the second section being openable relative to the first section.

With this configuration, when the operations unit is in use, the second unit in which the camera unit is disposed is in an open position relative to the first unit in which the operations unit is disposed. When the second unit is in the open position, the light source is spaced apart from the operations unit and therefore is able to illuminate a wide area of the operations unit.

It is also preferable that the camera unit be stored in a casing that is movable relative to the device main body, and the casing project from the device main body such that the light source faces the operations unit when the light source is in an operations unit illuminating position for emitting light for illuminating the operations unit.

With this configuration, as the light source illuminates the operations unit from the position outside the device main body, the light source can efficiently illuminate the operations unit compared with illuminating the operations unit from the inside of the device main body.

It is also preferable that the camera detect a brightness level on the operations unit, and the emission of light by the light source for illuminating the operations unit be started or stopped according to the brightness level detected by the camera.

This configuration makes it possible to illuminate the operations unit with a proper amount of light according to the brightness level on the operations unit and thereby to reduce power consumption.

It is also preferable that the above-described electronic device further comprise plural microswitches that detect the position of the light source; and a light source control unit that, according to the position of the light source detected by the microswitches, interlocks the emission of light by the light source with the image capturing by the camera when the light source is in an image capturing position for emitting light for image capturing by the camera, and separates the emission of light by the light source from the image capturing by the camera when the light source is in an operations unit illuminating position for emitting light for illuminating the operations unit.

The provision of the microswitch allows easy and inexpensive position detection of the light source. In addition, this configuration makes it possible to automatically switch the light source between a mode to be used as auxiliary light for the camera and a mode to be used as illumination for the operations unit according to the position of the light source.

In an embodiment of the present invention, a light source that emits auxiliary light for image capturing by a camera is also used to illuminate an operations unit, thereby making an electronic device more compact and with fewer components.

DETAILED DESCRIPTION OF THE PREFERRED EMBODIMENT

Preferred embodiments of the present invention are described hereinafter with reference to the accompanying drawings.

Figure 1:
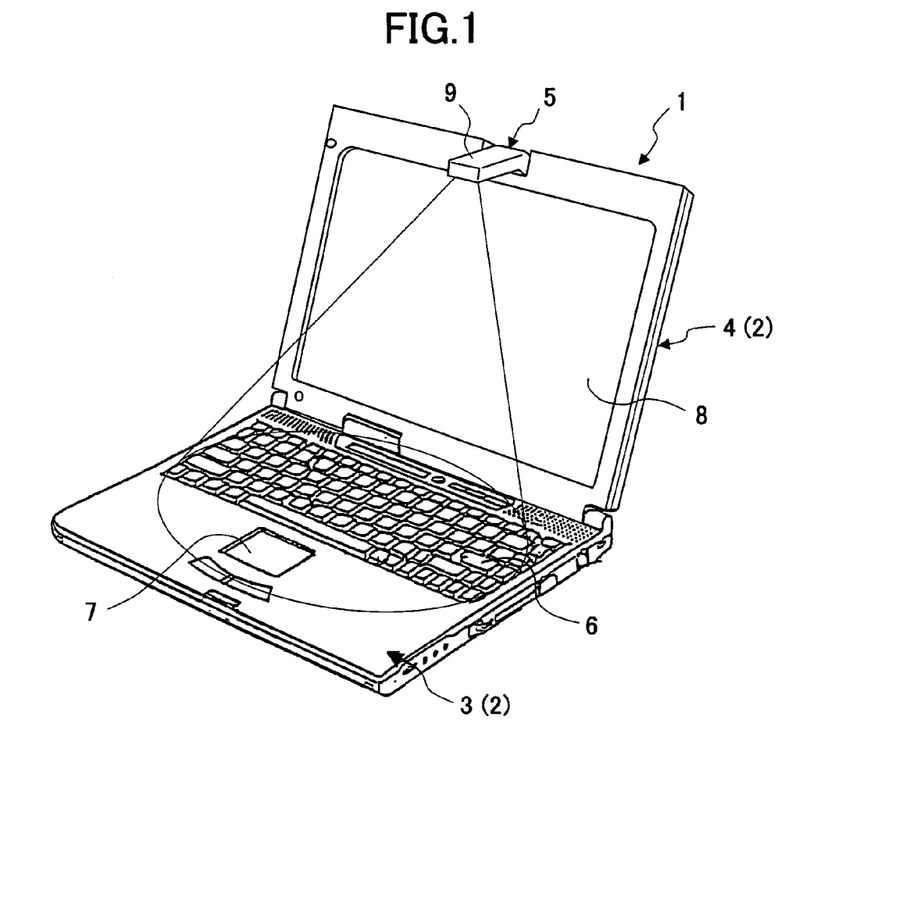
FIG. 1 is a perspective view showing an electronic device with a rotatable section in an open position according to an embodiment of the present invention.
Figure 2:
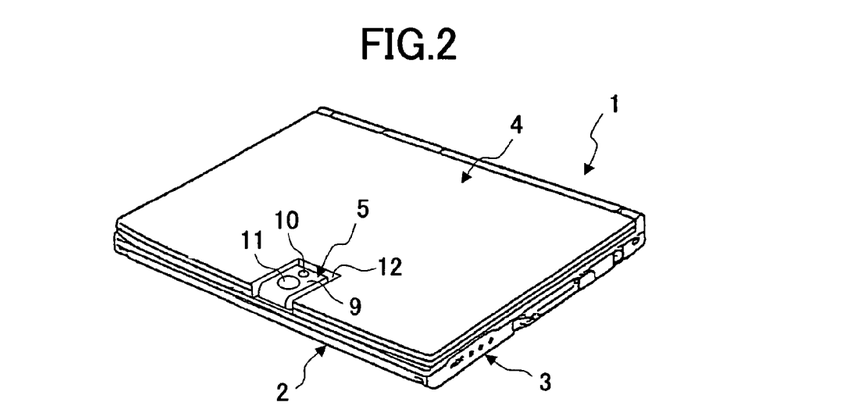
FIG. 2 is a perspective view showing an electronic device with a rotatable section in a closed position according to an embodiment of the present invention.
Figure 3:
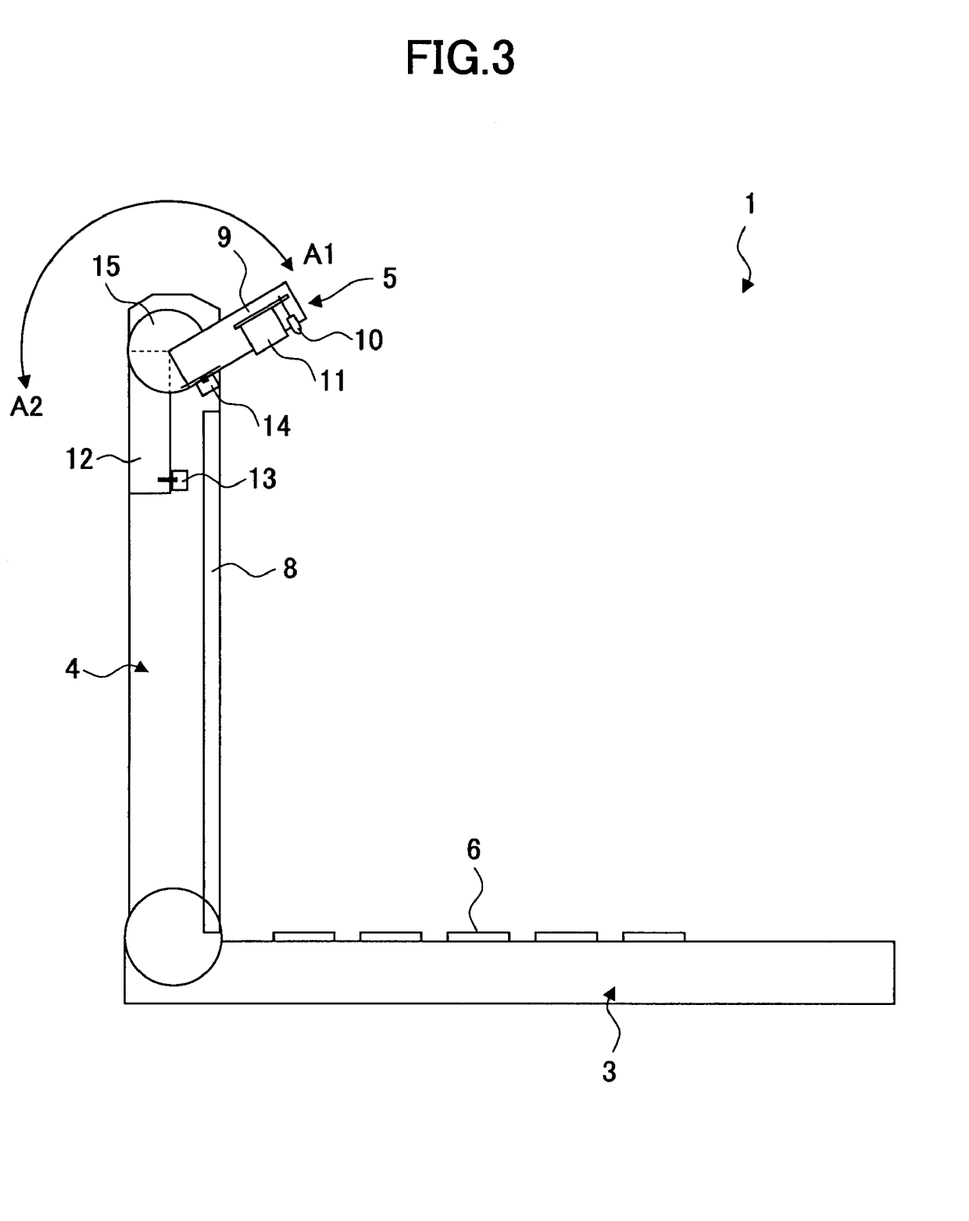
FIG. 3 is a diagram showing a configuration of an electronic device according to an embodiment of the present invention.
Figure 4:
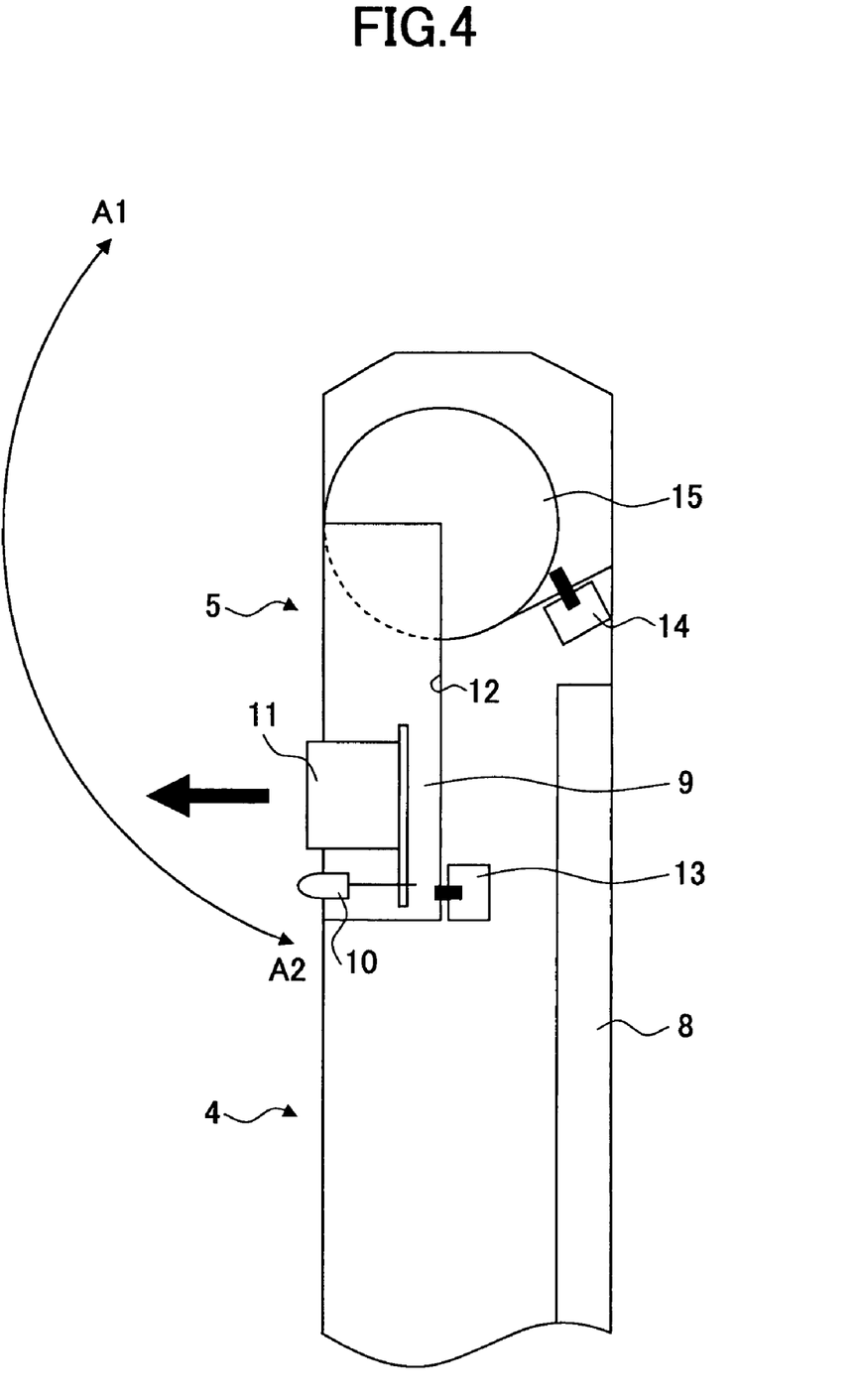
FIG. 4 is a diagram used to describe movement of a camera unit, wherein the camera unit is in a storage section.
Figure 5:
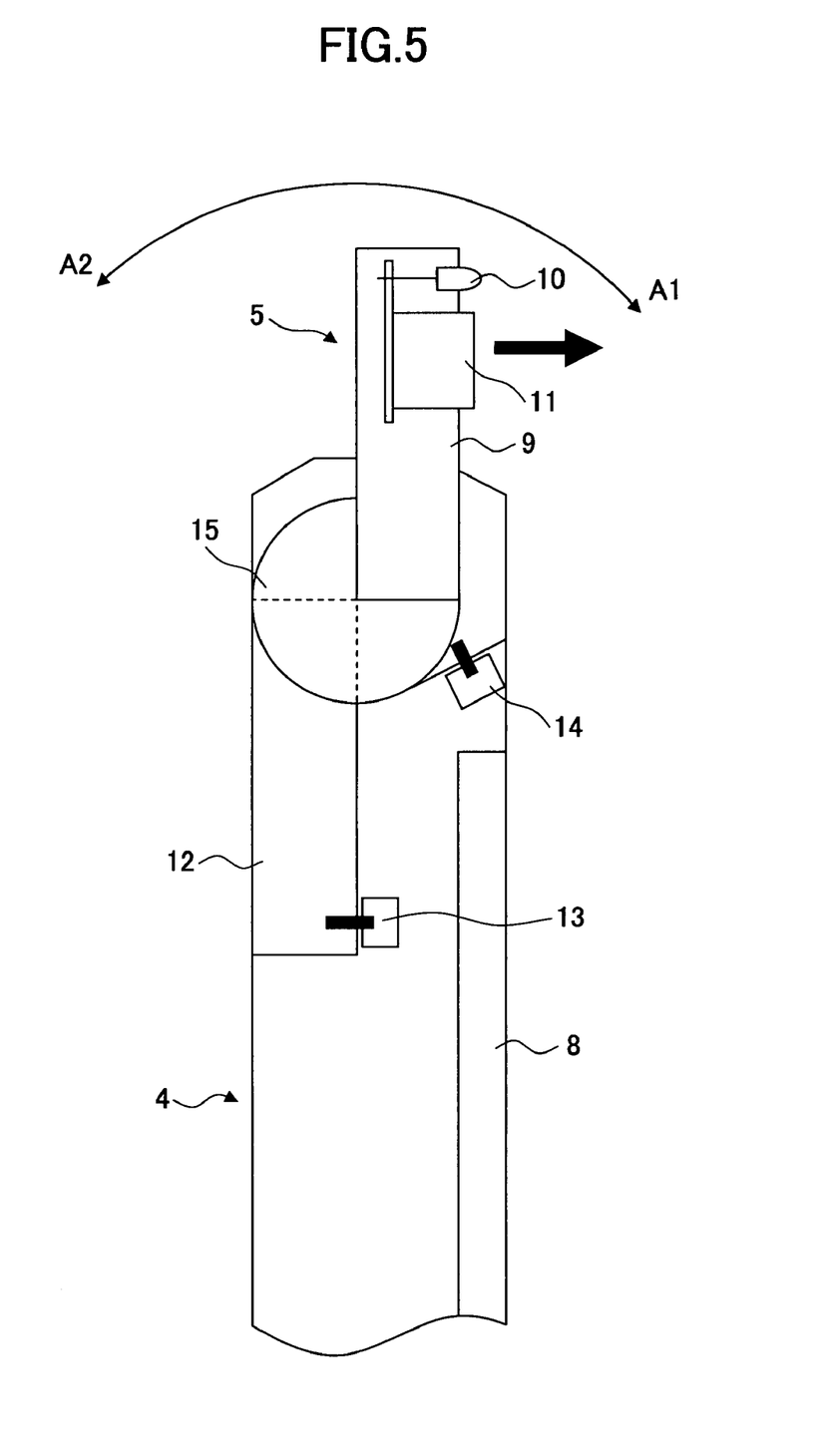
FIG. 5 is a diagram used to describe movement of a camera unit, wherein the camera unit is in a standing position.
Figure 6:
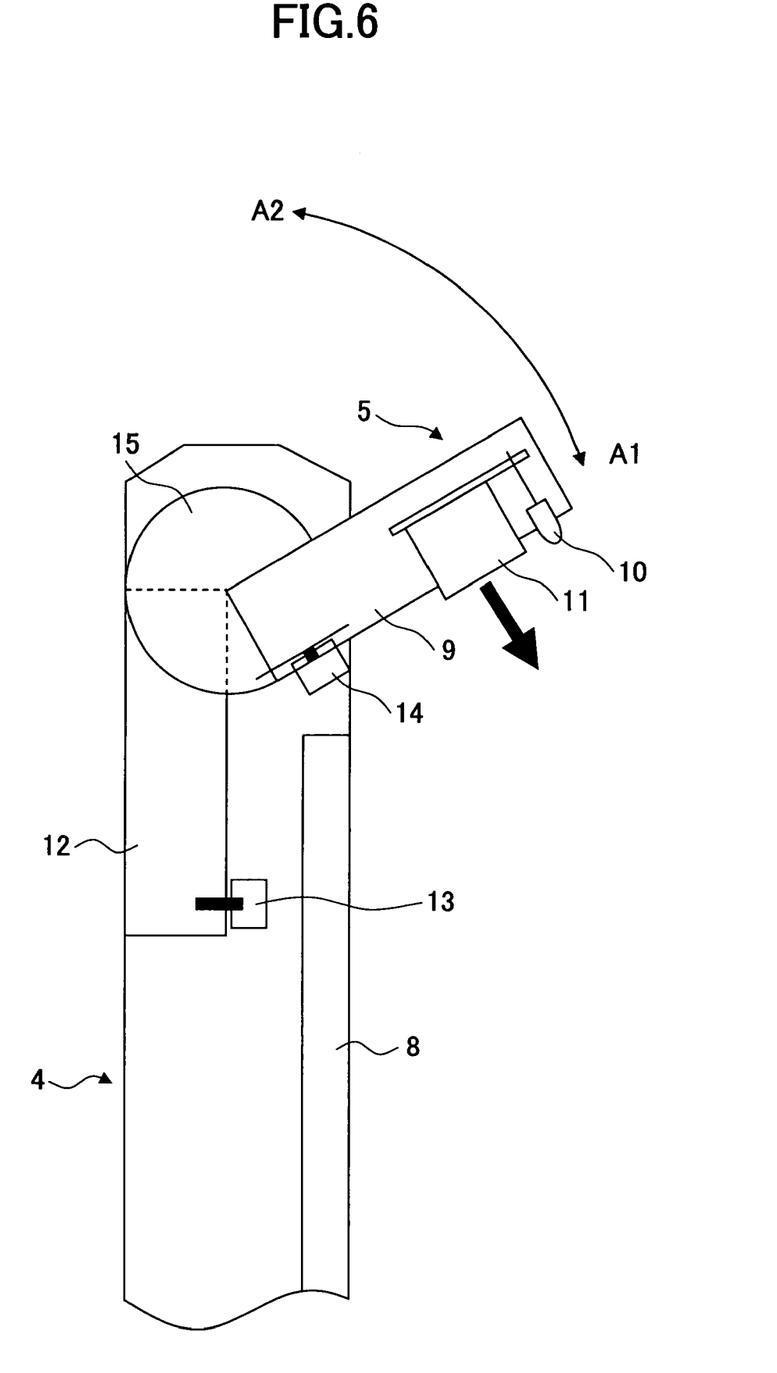
FIG. 6 is a diagram used to describe movement of a camera unit, wherein the camera unit is in an illuminating position.

FIGS. 1 through 3 are schematic diagrams each showing an electronic device 1 according to an embodiment of the present invention. FIGS. 4 through 6 are used to describe movement of a camera unit 5 of the electronic device 1.

In the present embodiment, a portable personal computer is used as an example of the electronic device 1. However, the present invention is not limited thereto but is applicable to various electronic devices having operations units.

The electronic device 1 generally includes a device main body 2. The device main body 2 includes a stationary section 3 and a rotatable section 4. The stationary section 3 is placed on a desk or the like when the electronic device is in use. An operations unit including a keyboard 6 and a flat point 7 is disposed in the stationary section 3. The rotatable section 4 is rotatable relative to the stationary section 3. A liquid crystal display 8 is disposed in the inner face of the rotatable section 4. FIG. 1 shows the electronic device 1 in use, wherein the rotatable section 4 is in an open position relative to the stationary section 3. FIG. 2 shows the electronic device 1 not in use (or being carried), wherein the rotatable section 4 is in a closed position relative to the stationary section 3.

Figure 7:
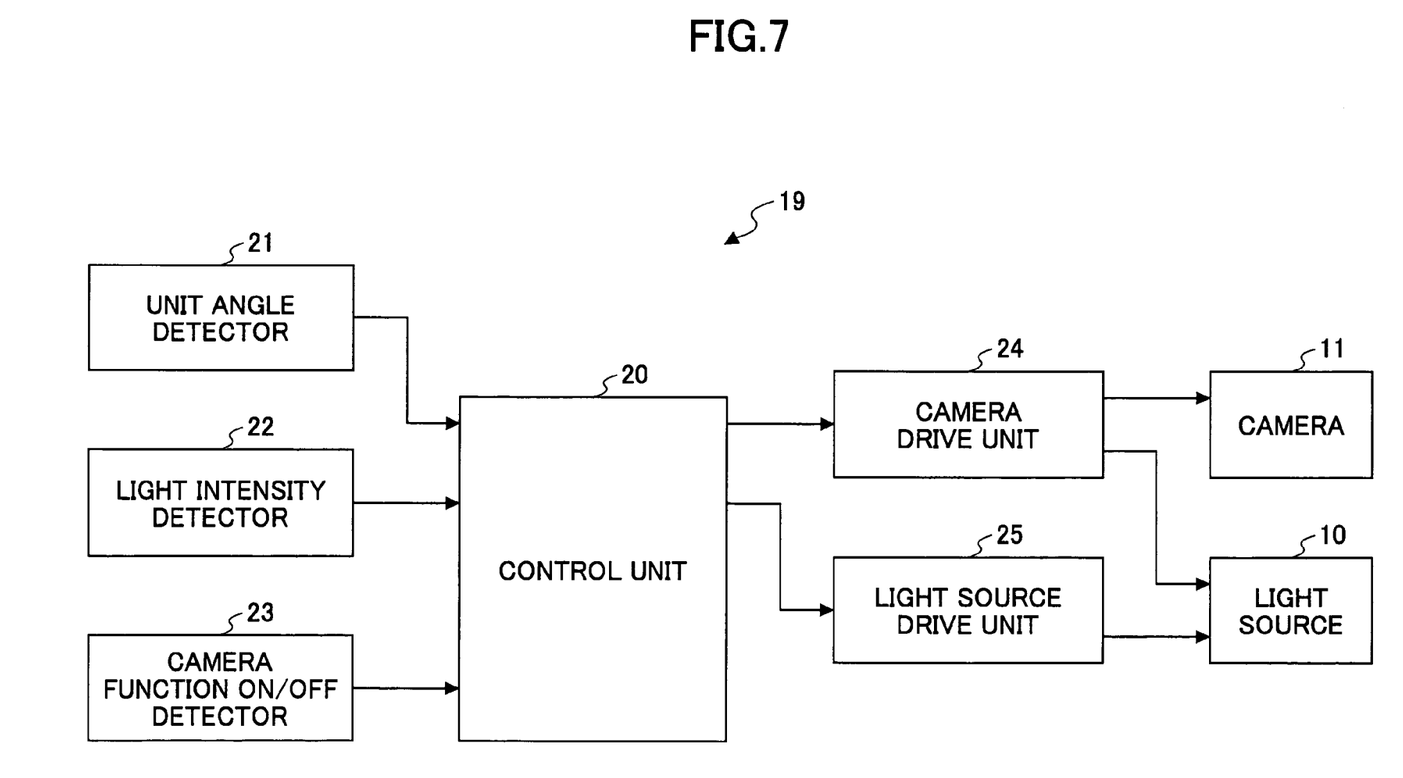
FIG. 7 is a block diagram showing a light source control device for controlling a light source.

The camera unit 5 includes, inside a casing 9, a light source 10 and a camera 11. The light source 10 serves as an auxiliary light source for the camera 11 and also as an illumination source for illuminating the keyboard 6 as described below. As shown in FIG. 7, the light source 10 is controlled by a control unit 20 through a camera drive unit 24 and a light source drive unit 25.

The camera 11 is a CCD image sensor, for example, and is configured to input an image of a subject and detect a brightness level in an imaging position. The light source 10 is controlled by the control unit 20 through the camera drive unit 24 as described below.

Referring to FIG. 3, the casing 9 with the light source 10 and the camera 11 disposed therein is attached to a rotary shaft 15 rotatably supported by the rotatable section 4. The camera unit 5 is rotatable about the rotary shaft 15 in the directions of arrows A1 and A2 of FIG. 3.

A storage section 12 for storing the camera unit 5 is provided in the back face of the rotatable section 4. When the camera unit 5 is rotated to the limit in the arrow A2 direction, the camera unit 5 is placed into the storage section 12. FIGS. 2 and 4 show the camera unit 5 in the storage section 12. As shown in FIGS. 2 and 4, when in the storage section 12, the camera unit 5 does not remain outside the device main body 2, thereby maintaining portability of the electronic device 1.

A first microswitch 13 is disposed inside the storage section 12 of the rotatable section 4, and a second microswitch 14 is disposed in the vicinity of the rotary shaft 15. These microswitches 13 and 14 serve as light source position detectors for detecting the position of the camera unit 5 (the light source 10).

Rotational movement of the camera unit 5 and position detection of the camera unit 5 (the light source 10) by the microswitches 13 and 14 are described below with reference to FIGS. 4 through 6.

FIG. 4 shows the camera unit 5 in the storage section 12 (hereinafter this position of the camera unit 5 is referred to as a storage position). When the camera unit 5 is in the storage position, the casing 9 of the camera unit 5 presses a switch knob of the first microswitch 13, so that the first microswitch 13 is ON.

Meanwhile, the casing 9 is spaced apart from the second microswitch 14, so that the second microswitch 14 is OFF. That is, when the first microswitch 13 is ON and the second microswitch 14 is OFF, this indicates that the camera unit 5 is in the storage position.

FIG. 5 shows the camera unit 5 rotated from the storage position in the arrow A1 direction to stand substantially in alignment with the rotatable section 4 (hereinafter this position of the camera unit 5 is called a standing position). When the camera unit 5 is in the standing position, the casing 9 of the camera unit 5 is spaced apart from both the switch knobs of the microswitches 13 and 14, so that both the microswitches 13 and 14 are OFF. That is, when both the microswitches 13 and 14 are OFF, this indicates that the camera unit 5 is in the standing position.

FIG. 6 shows the camera unit 5 with the light source 10 illuminating the keyboard 6 (hereinafter this position of the camera unit 5 is referred to as an illuminating position). When the camera unit 5 is in the illuminating position, the casing 9 of the camera unit 5 presses the switch knob of the second microswitch 14, so that the second microswitch 14 is ON.

Meanwhile, the casing 9 is spaced apart from the first microswitch 13, so that the first microswitch 13 is OFF. That is, when the first microswitch 13 is OFF and the second microswitch 14 is ON, this indicates that the camera unit 5 is in the illuminating position.

In this embodiment, the light of the light source 10 that is used as auxiliary light for imaging capturing by the camera 11 is also used as illumination for the operations unit, i.e., the keyboard 6 and the flat point 7.

The light source 10 is capable of continuously emitting light by being operated separately from the image capturing function of the camera 11. Therefore, it is possible to use the electronic device 1 in dark places by illuminating the keyboard 6 and the flat point 7 with the light source 10 without using a light source provided separately from the electronic device 1. Since the light source 10 that is originally provided as the camera unit 5 of the electronic device 1 is used for illuminating the keyboard 6 and the flat point 7, it is possible to make the electronic device 1 more compact and with fewer components compared with an electronic device provided with an illumination device dedicated for illuminating the keyboard 6 and the flat point 7.

As shown in FIGS. 1, 3, and 6, when the camera unit 5 is in the illuminating position, the light source 10 faces the operations unit, i.e., the keyboard 6 and the flat point 7. More specifically, when the camera unit 5 is in the illuminating position, the casing 9 is at an angle relative to the rotatable section 4 such that the light source 10 is able to illuminate substantially the entire surfaces of the keyboard 6 and the flat point 7.

The light source 10 is in the upper part of the rotatable section 4 when the rotatable section 4 is in the open position relative to the stationary section 3. Accordingly, the light source 10 is spaced apart upward from the keyboard 6 and the flat point 7 and therefore is able to illuminate a wide area of the keyboard 6 and the flat point 7.

When the camera unit 5 is in the illuminating position, the casing 9 projects forward (toward the keyboard 6) from the rotatable section 4. With this configuration, as the light source 10 illuminates the keyboard 6 and the flat point 7 from the position outside the rotatable section 4 (device main body 2), the light source 10 can efficiently illuminate the keyboard 6 and the flat point 7 compared with illuminating from the inside of the rotatable section 4.

Described below is a light source control device 19 for controlling the light source 10. FIG. 7 is a block diagram showing the light source control device 19.

A unit angle detector 21 shown in FIG. 7 corresponds to the first and second microswitches 13 and 14. In this embodiment, the camera 11 is used as a light intensity detector 22. A camera function ON/OFF detector 23 is adapted to detect activation of an application that uses the camera unit 5 by monitoring applications installed in the electronic device 1. These detectors 21 through 23 are connected to the control unit 20 that controls the camera unit 5.

The camera drive unit 24 drives the camera 11, and the light source drive unit 25 drives the light source 10. These drive units 24 and 25 are controlled by the control unit 20.

Figure 8:
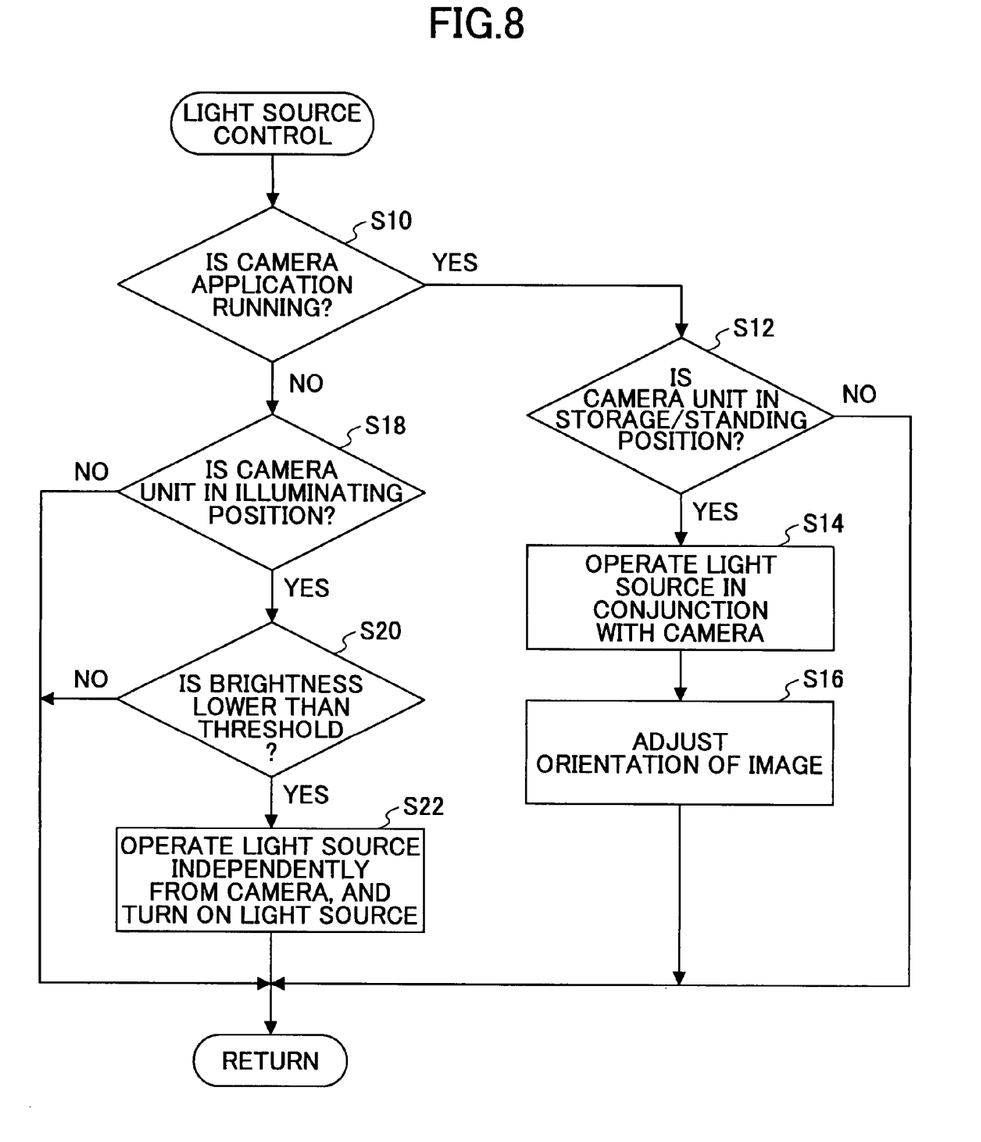
FIG. 8 is a flowchart showing light source control processing to be performed by the light source control device.

The following describes control processing of the light source 10 by the control unit 20. The light source control processing shown in FIG. 8 is a routine repeatedly performed every predetermined time.

When the light source control processing starts, the control unit 20 detects, according to a detection signal from the camera function ON/OFF detector 23, whether any of the applications that use the camera unit 5 are running. If the determination in Step S10 is affirmative (Yes), the processing proceeds to Step S12, in which the control unit 20 determines whether the camera unit 5 is in the storage position (see FIGS. 2 and 4) or in the standing position (see FIG. 5). If, in Step S12, the camera unit 5 is determined not to be either in the storage position or in the standing position, the light source control processing is terminated.

On the other hand, if the determination in step S12 is affirmative (Yes), the control unit 20 makes the light source 10 work in conjunction with the camera 11 in Step S14. Thus, the light source 10 is enabled, emitting auxiliary light for image capturing by the camera 11. In this case, the control unit 20 controls both the light source 10 and the camera 11 through the camera drive unit 24.

Then in Step S16, the orientation of the image to be captured by the camera 11 is adjusted according to whether the camera unit 5 is determined to be in the storage position or in the standing position. As is clear from FIGS. 4 and 5, the orientations of the camera unit 5 in the storage position and in the standing position are opposite. Therefore, in Step S16, the orientation of the image is adjusted by vertical inversion of the image according to the position of the camera unit 5.

If the determination in Step S10 is negative (No), i.e., if the camera 11 is determined not to be in use by the electronic device 1, the processing proceeds to Step S18. In Step S18, the control unit 20 determines whether the camera unit 5 is in the illuminating position according to a detection signal from the unit angle detector 21 (the first and second microswitches 13 and 14). If the camera unit 5 is not in the illuminating position, since there is no need to perform processing in Step S20 and the following Step S22, the light source control processing is terminated.

If, in step S18, the camera unit 5 is determined to be in the illuminating position, then in Step S20, the control unit 20 determines whether the brightness level in a light irradiation position (i.e., on the keyboard 6 and the flat point 7) is lower than a threshold according to a signal from the light intensity detector 22 (the camera 22). The threshold described herein is a level of brightness (darkness) at which a user of the electronic device 1 becomes unable to use the keyboard 6 and the flat point 7 without use of illumination.

If the determination in Step S20 is negative (No), i.e., if the brightness level on the keyboard 6 and the flat point 7 is high enough to allow user operations, the light source control processing is terminated without turning on the light source 10.

On the other hand, if the determination in Step S20 is affirmative (Yes), i.e., if the brightness level on the keyboard 6 and the flat point 7 is too low to use them, then in step S22, the control unit 20 makes the light source 10 work independently from the camera 11 and turns on the light source 10 by controlling the light source drive unit 25.

In this step, since the brightness level on the keyboard 6 and the flat point 7 is detected by the light intensity detector 22, the light emitting amount of the light source 10 may be adjusted according to the detected brightness level. With this configuration, since the light source 10 emits light according to the brightness level on the keyboard 6 and the flat point 7, both operability of the keyboard 6 and the flat point 7 and efficiency of power use are improved.

As described above, the light source control processing of this embodiment makes it possible to automatically switch the light source 10 between the mode to be used as auxiliary light for the camera 11 and the mode to be used as illumination for the keyboard 6 and the flat point 7. This improves operability of the electronic device 1 in dark places.

What is claimed is:

1. An electronic device comprising:
    an operations unit disposed in a device main body for input operations;
    a camera unit including a camera for image capturing and a light source that emits light to provide either an auxiliary image capturing function or an operations-unit illuminating function, both the camera and the light source being housed in a casing of the camera unit, and a light irradiation position of the light source being variable so that the light source illuminates the operations unit;
    a light intensity detector to detect a brightness level of the light irradiation position of the light source on the operations unit; and
    a control unit to separate the emission of light by the light source from the image capturing by the camera when the camera unit is in an operations-unit illuminating position for emitting light to provide the operations-unit illuminating function, to interlock the emission of light by the light source with the image capturing by the camera when the camera unit is in an image capturing position for emitting light to provide the auxiliary image capturing function, and to start the emission of light by the light source to provide the operations-unit illuminating function when the brightness level detected by the light intensity detector is below a threshold level.

2. The electronic device as claimed in claim 1, further comprising:
    a light source position detector to detect a position of the light source to generate position detection information; and
    a light source control unit to receive the position detection information generated by the light source position detector.

3. The electronic device as claimed in claim 1, wherein the device main body includes a first section in which the operations unit is disposed and a second section in which the camera unit is disposed, the second section being openable relative to the first section.

4. The electronic device as claimed in claim 1,
    wherein the casing is movable relative to the device main body; and
    when the camera unit is in the operations-unit illuminating position for emitting light for illuminating the operations unit, the casing projects from the device main body such that the light source faces the operations unit.

5. The electronic device as claimed in claim 1, further comprising:
    a plurality of microswitches to detect a position of the light source; and
    a light source control unit to receive the position of the light source detected by the plurality of microswitches.

6. The electronic device as claimed in claim 1, wherein the camera includes the light intensity detector.

\* \* \* \* \*